(12) United States Patent
Kang et al.

(10) Patent No.: US 9,973,044 B2
(45) Date of Patent: May 15, 2018

(54) MOTOR STATOR

(71) Applicant: DELTA ELECTRONICS, INC., Taoyuan County (TW)

(72) Inventors: Chao-Hsing Kang, Taoyuan County (TW); Chien-Ho Lee, Taoyuan County (TW); Tsung-Yin Lee, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 356 days.

(21) Appl. No.: 14/719,730

(22) Filed: May 22, 2015

(65) Prior Publication Data

US 2015/0340925 A1    Nov. 26, 2015

Related U.S. Application Data

(60) Provisional application No. 62/001,898, filed on May 22, 2014.

(51) Int. Cl.
*H02K 11/00* (2016.01)
*H02K 1/16* (2006.01)
(Continued)

(52) U.S. Cl.
CPC ............ *H02K 1/16* (2013.01); *F04D 17/08* (2013.01); *F04D 19/002* (2013.01);
(Continued)

(58) Field of Classification Search
CPC ......... H02K 1/16; F04D 17/08; F04D 19/002; F04D 25/0613; F04D 29/053; F04D 29/281; F04D 29/325
(Continued)

(56) References Cited

U.S. PATENT DOCUMENTS

2003/0146671 A1* 8/2003 Diehl ............... H02K 1/185
310/71
2005/0046287 A1* 3/2005 Huang .............. H02K 1/145
310/67 R
(Continued)

FOREIGN PATENT DOCUMENTS

CN    1271990    11/2000
CN    101826783    9/2010

OTHER PUBLICATIONS

Office Action dated Apr. 6, 2017 from corresponding application No. CN 201510262291.6.

*Primary Examiner* — Jianchun Qin
(74) *Attorney, Agent, or Firm* — Hauptman Ham, LLP (57) ABSTRACT

A motor stator includes a bobbin bracket, a modular mounting bracket, and a modular change box. The bobbin bracket includes a plurality of bobbins circularly disposed in a radial pattern. The modular mounting bracket is disposed on the bobbin bracket. The modular mounting bracket is formed with a first slide structure. The first slide structure is perpendicular to an axial direction of the bobbin bracket. A sensing circuit board is disposed in the modular change box. The modular change box is formed with a second slide structure. The second slide structure is perpendicular to the axial direction of the bobbin bracket and slidably connected into the first slide structure, so as to assemble the modular change box to the modular mounting bracket along a radial direction of the bobbin bracket.

16 Claims, 9 Drawing Sheets

(51) Int. Cl.
    *F04D 17/08*     (2006.01)
    *F04D 19/00*     (2006.01)
    *F04D 29/053*     (2006.01)
    *F04D 29/28*     (2006.01)
    *F04D 29/32*     (2006.01)
    *H02K 1/27*     (2006.01)
    *H02K 1/30*     (2006.01)
    *H02K 5/10*     (2006.01)
    *H02K 5/22*     (2006.01)
    *H02K 7/14*     (2006.01)
    *F04D 25/06*     (2006.01)
    *F04D 29/64*     (2006.01)
    *H02K 9/06*     (2006.01)

(52) U.S. Cl.
    CPC ....... *F04D 25/0613* (2013.01); *F04D 29/053* (2013.01); *F04D 29/281* (2013.01); *F04D 29/325* (2013.01); *F04D 29/329* (2013.01); *F04D 29/646* (2013.01); *H02K 1/2786* (2013.01); *H02K 1/30* (2013.01); *H02K 5/10* (2013.01); *H02K 5/225* (2013.01); *H02K 7/14* (2013.01); *H02K 9/06* (2013.01)

(58) Field of Classification Search
    USPC .......................................................... 310/71
    See application file for complete search history.

(56) References Cited

U.S. PATENT DOCUMENTS

| | | | |
|---|---|---|---|
| 2009/0026859 A1* | 1/2009 | Kinoshita | H02K 3/522 310/71 |
| 2010/0141059 A1* | 6/2010 | Nishimura | H02K 1/02 310/44 |

* cited by examiner

MOTOR STATOR

TECHNICAL FIELD

The present invention relates to a motor in a large-size fan and, in particular, to a motor stator having a replaceable sensing element. The present application claims priority from U.S. provisional application Ser. No. 62/001,898 (Parent Provisional Application) filed on May 22, 2014.

BACKGROUND

A motor of the conventional large-size fan generally includes a stator base, a stator disposed on the stator base, and a rotor pivotally disposed on the stator base. The stator includes a coil, and the rotor includes a magnet. When electrical current passes through the coil of the stator, a magnetic field is produced to rotate the rotor. In order to control the rotor to rotate stably, a thermal fuse and a hall sensor are normally disposed in the motor so that the temperature and rotation speed of the motor could be sensed as a reference for control.

Generally, the thermal fuse and hall sensor are disposed on a sensing circuit board. The coil is electrically connected to the sensing circuit board. The sensing circuit board is electrically connected to a control circuit board by means of a flat cable. The power supplied to the coil is controlled by the control circuit board. The shortcoming is that when replacing the thermal fuse and the hall sensor, the sensing circuit board has to be replaced, and the sensing circuit board and the stator have to be removed together. Moreover, after replacement of the sensing circuit board, it is necessary to test whether the thermal fuse and the hall sensor are working normally. In addition, it is also necessary to test whether the coil can be powered on normally. Thus, maintenance of the conventional motor is difficult.

In view of the foregoing, the inventor made various studies to improve the above-mentioned problems, on the basis of which the present invention is accomplished.

SUMMARY

The present invention provides a motor stator having a replaceable sensing element.

The present invention provides a motor stator which includes a bobbin bracket, a modular mounting bracket, and a modular change box. The bobbin bracket includes a plurality of bobbins circularly disposed in a radial pattern. The modular mounting bracket is disposed on the bobbin bracket and is formed with a first slide structure. The first slide structure is perpendicular to an axial direction of the bobbin bracket. A sensing circuit board is disposed in the modular change box. The modular change box is formed with a second slide structure. The second slide structure is perpendicular to the axial direction of the bobbin bracket and slidably connected into the first slide structure so as to assemble the modular change box to the modular mounting bracket along a radial direction of the bobbin bracket.

In the motor stator of the present invention, the sensing circuit board is disposed in the modular change box so that replacement of the modular change box can be made quickly to facilitate maintenance.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Figure 1:
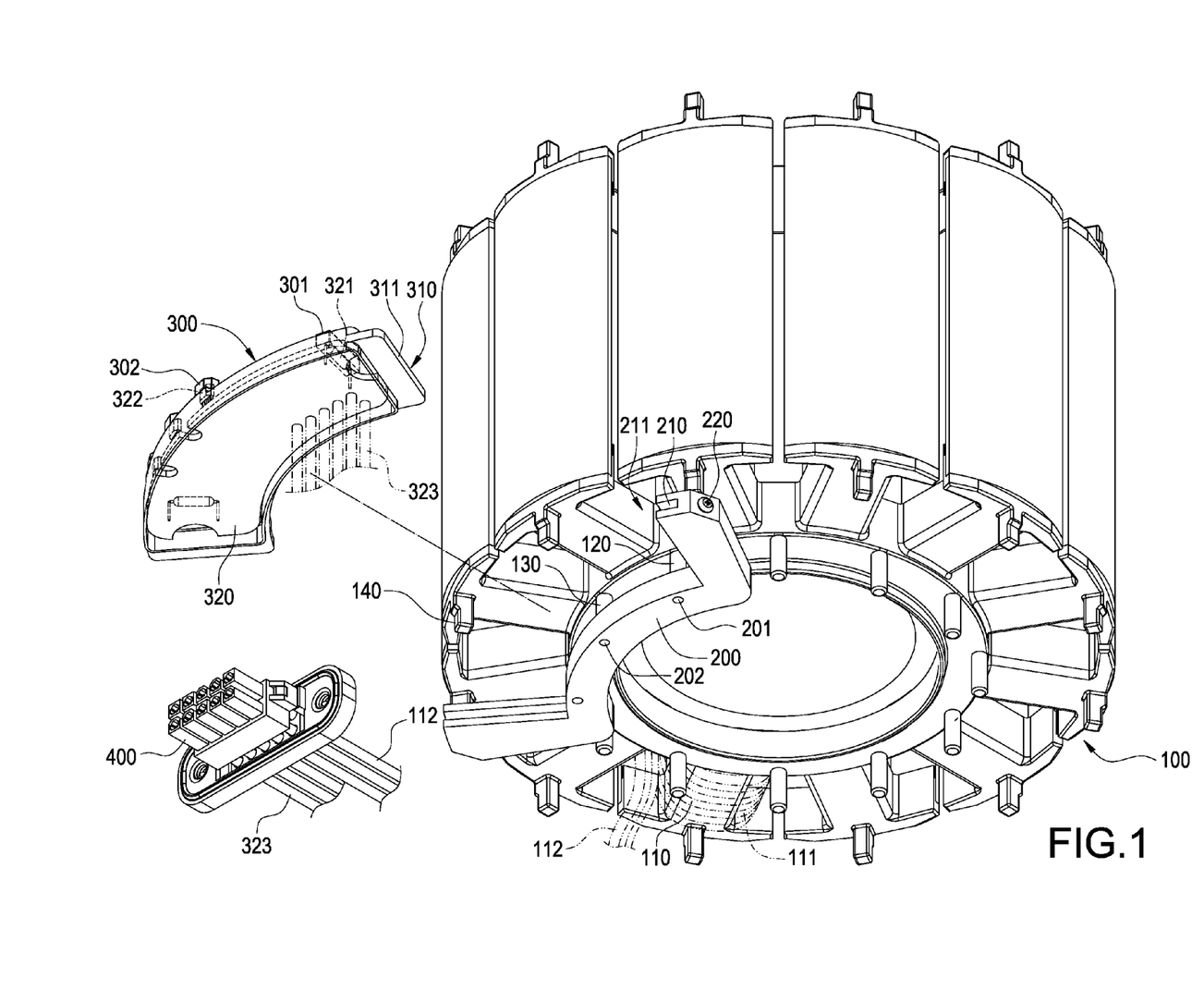
FIG. 1 is a perspective exploded view of a motor stator according to a first embodiment of the present invention.
Figure 2:
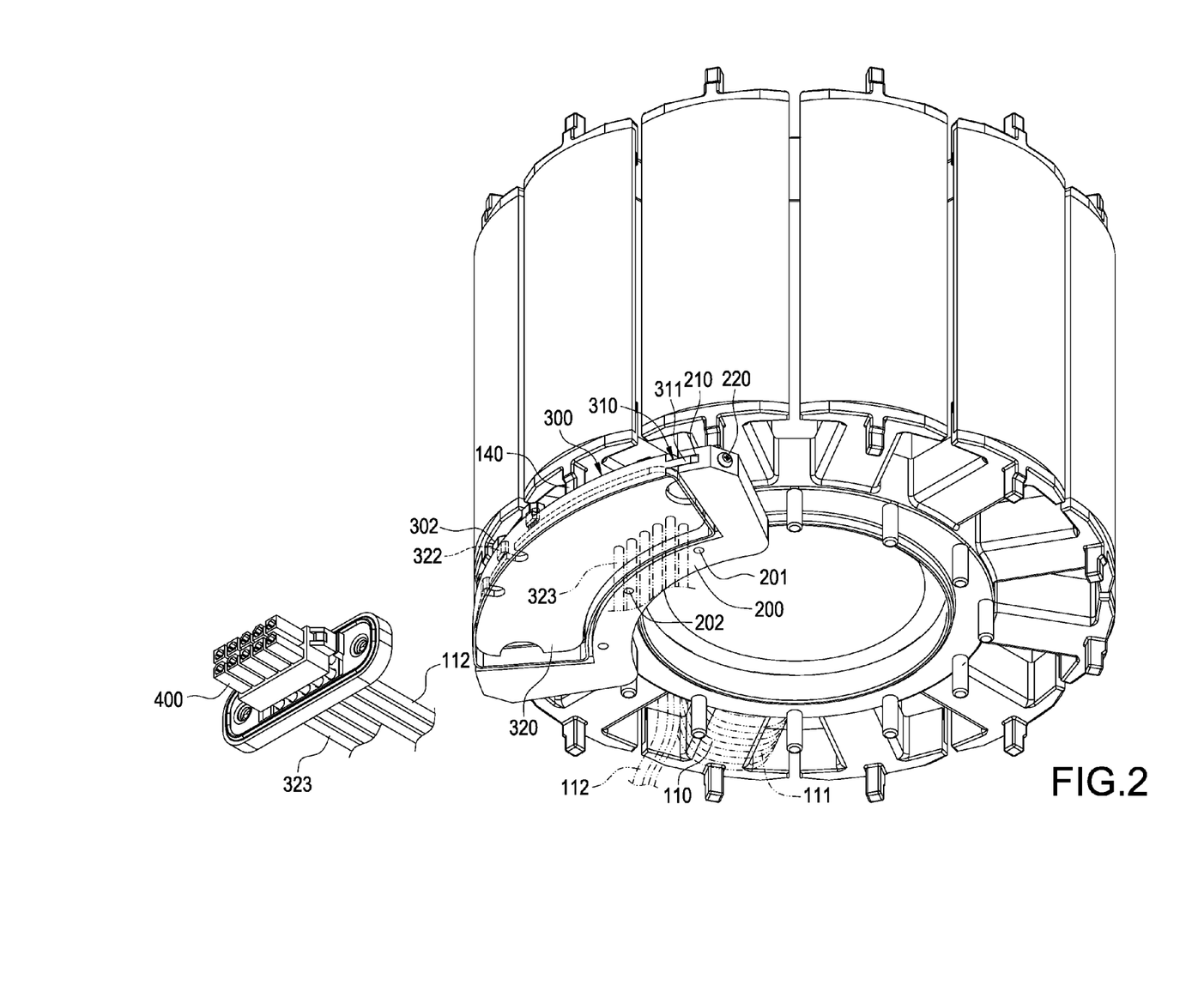
FIG. 2 is a schematic perspective view of the motor stator according to the first embodiment of the present invention.

Referring to FIGS. 1 and 2, a motor stator is provided according to a first embodiment of the present invention, which is configured to be disposed on a stator base (not illustrated). The motor stator is externally enclosed by a motor rotor (not illustrated) pivotally disposed on the stator base. The motor stator produces a magnetic field to drive the motor rotor to rotate upon powering on of the motor stator. In the present invention, the motor stator includes a bobbin bracket 100, a modular mounting bracket 200, and a modular change box 300.

According to the present embodiment, it is preferable that the bobbin bracket 100 is in a cylindrical shape, a plurality of bobbins 110 extend from a side surface of the bobbin bracket 100 along a radial direction of a motor rotation shaft, and the bobbins 110 are arranged circularly in a radial pattern around the motor rotation shaft. The bobbin bracket 100 is wound by at least one coil 111. In the present embodiment, each coil 111 winds a respective one of the bobbins 110, and the coil 111 is electrically connected to a connector 400 by means of a driving flat cable 112. At least one screw stud 120 and at least one positioning stud 130 extend from the bobbin bracket 100. In the present embodiment, a plurality of the screw studs and a positioning stud 130 are disposed on one end of the bobbin bracket 100. The positioning stud 130 and each of the screw studs 120 extend along an axial direction of the motor rotation shaft. A blocker 140 extends from a respective one of the bobbins 110 and along the axial direction of the motor rotation shaft.

In the present embodiment, the modular mounting bracket 200 is a fan-shaped frame. The modular mounting bracket 200 is disposed on one end of the bobbin bracket 100. The modular mounting bracket 200 is formed thereon with a screw hole 201 for screwing in an end of the screw stud 120 and an insertion hole 202 for positioning and insertion of the positioning stud 130. The modular mounting bracket 200 can be positioned on the bobbin bracket 100 by insertion of the positioning stud 130 into the insertion hole 202 so that each screw stud 120 can be screwed in with ease. At least one blocker 140 on the bobbin bracket 100 is in contact with the modular mounting bracket 200 so that the modular mounting bracket 200 and the bobbin 110 are spaced apart, thereby avoiding interfering with the coil 111 wound on the bobbin 110.

At least one first slide structure 210 is formed on the modular mounting bracket 200. In the present embodiment, there are two first slide structures 210, and each of the first slide structures 210 is a slide groove 211. The slide groove 211 is perpendicular to an axial direction of the bobbin bracket 100, i.e. perpendicular to the axial direction of the motor rotation shaft. It is preferable that the slide groove 211 is disposed along a radial direction of the bobbin bracket 100. A socket set screw 220 is screwed into the modular mounting bracket 200, and the socket set screw 220 is inserted into the slide groove 211.

In the present embodiment, the modular change box 300 is a fan-shaped box. A plurality of chambers 301 and 302 are formed in the modular change box 300. A sensing circuit board 320 is disposed in the modular change box 300. The sensing circuit board 320 is electrically connected to the connector 400 by means of a sensing cable 323. At least one temperature sensing element 321 and a plurality of hall sensors 322 are disposed on the sensing circuit board 320. In the present embodiment, the sensing circuit board 320 preferably includes two temperature sensing elements 321 and three hall sensors 322, and the temperature sensing elements 321 and the hall sensors 322 are disposed in two the chambers 301 and 302, respectively. The hall sensors 322 are arranged along a circumferential direction of the bobbin bracket 100, and an arc region in which the hall sensors 322 are disposed preferably encompasses at least two bobbins 110. A rotation speed of the motor rotor can be calculated upon sensing a magnetic field variation of magnets (not illustrated) on a metallic housing of the rotor by using the hall sensor 322.

The modular change box 300 is formed with at least one second slide structure 310. The second slide structure 310 is perpendicular to the axial direction of the bobbin bracket 100 and slidably connected into the first slide structure 210 so as to assemble the modular change box 300 to the modular mounting bracket 200 along the radial direction of the bobbin bracket 100. In the present embodiment, the modular change box 300 includes two slide structures 310. Each of the second slide structures 310 is a flange 311 extending from each straight side of the modular change box 300. The flange 311 is slidably connected with the slide groove 211, and thereby the modular change box 300 is assembled to the modular mounting bracket 200 along the radial direction of the bobbin bracket 100. The socket set screw 220 can be fastened to the flange 311 to thereby fix the modular change box 300 to the modular mounting bracket 200. At least one blocker 140 on the bobbin bracket 100 is in contact with the modular change box 300 so that the modular change box 300 and the bobbin 110 are spaced apart to avoid interfering with the coil 111 wound on the bobbin 110.

The connector 400 is preferably connected to a control circuit board (not illustrated). The control circuit board supplies power to the coil 111 by means of the connector 400 via the driving flat cable 112. The control circuit board is connected to the temperature sensing element 321 and the hall sensor 322 by means of the connector 400 via the sensing flat cable 323. The hall sensor 322 provides data about a frequency variation of the magnetic field. The temperature sensing element 321 is preferably a thermal fuse. When the motor has a temperature higher than the limit of the thermal fuse, the thermal fuse is broken to cause a broken circuit, and the motor stops. When there is a need to replace the sensing circuit board 320, the replacement can be completed simply by replacing the modular change box 300, and there is no need to remove the bobbin bracket 100.

Figure 3:
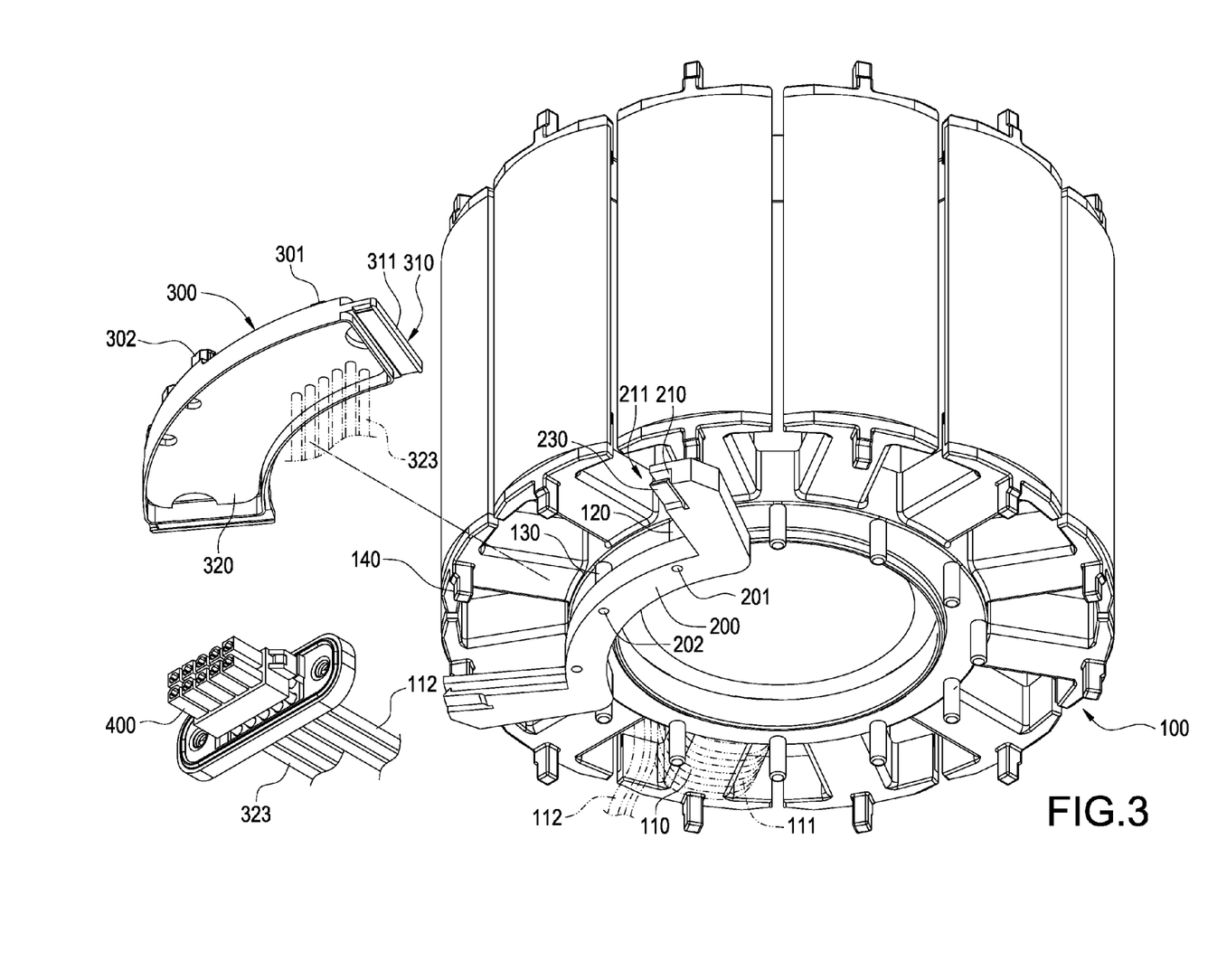
FIG. 3 is a perspective exploded view of a motor stator according to a second embodiment of the present invention.
Figure 4:
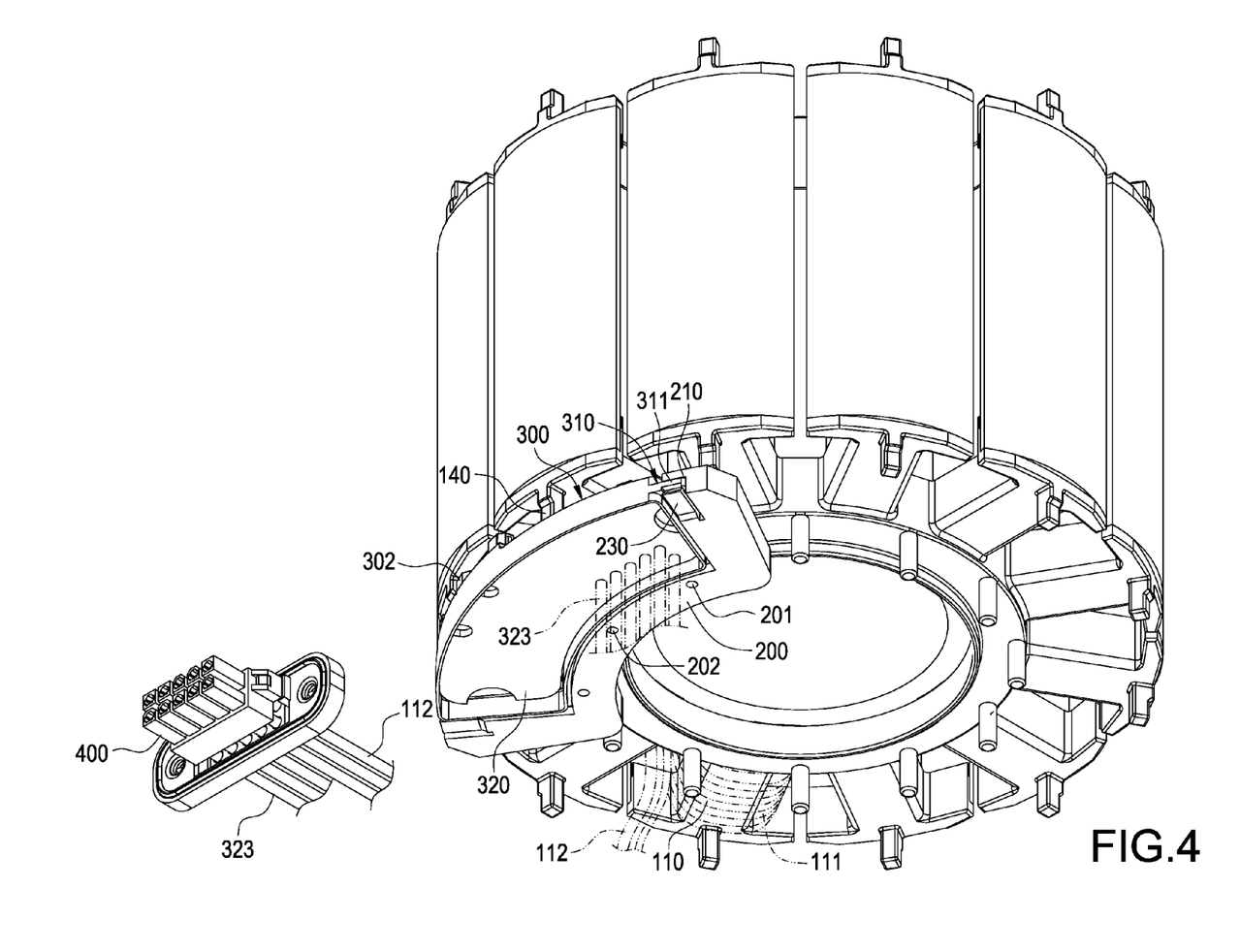
FIG. 4 is a schematic perspective view of the motor stator according to the second embodiment of the present invention.

Referring to FIGS. 3 and 4, a motor stator is provided according to a second embodiment of the present invention, which is configured to be disposed on a stator base (not illustrated). The motor stator is externally enclosed by a motor rotor (not illustrated) pivotally disposed on the stator base. A magnetic field is produced upon powering on of the motor stator so as to drive the motor rotor to rotate. The motor stator of the present invention includes a bobbin bracket 100, a modular mounting bracket 200, and a modular change box 300. A structure of the motor stator is similar to that in the first embodiment, so descriptions about similar or the same parts are omitted therein for brevity.

The present embodiment is different from the first embodiment in that two flexible hooks 230 are disposed on the modular mounting bracket 200, and the two flexible hooks 230 are adapted to engage the modular change box 300. It is preferable that each of the flexible hooks 230 is disposed corresponding to a respective one of the slide grooves 211, and is disposed toward the corresponding slide groove 211. Each flexible hook 230 is engaged with a respective one of the flanges 311 so as to fix the modular change box 300 to the modular mounting bracket 200.

Figure 5:
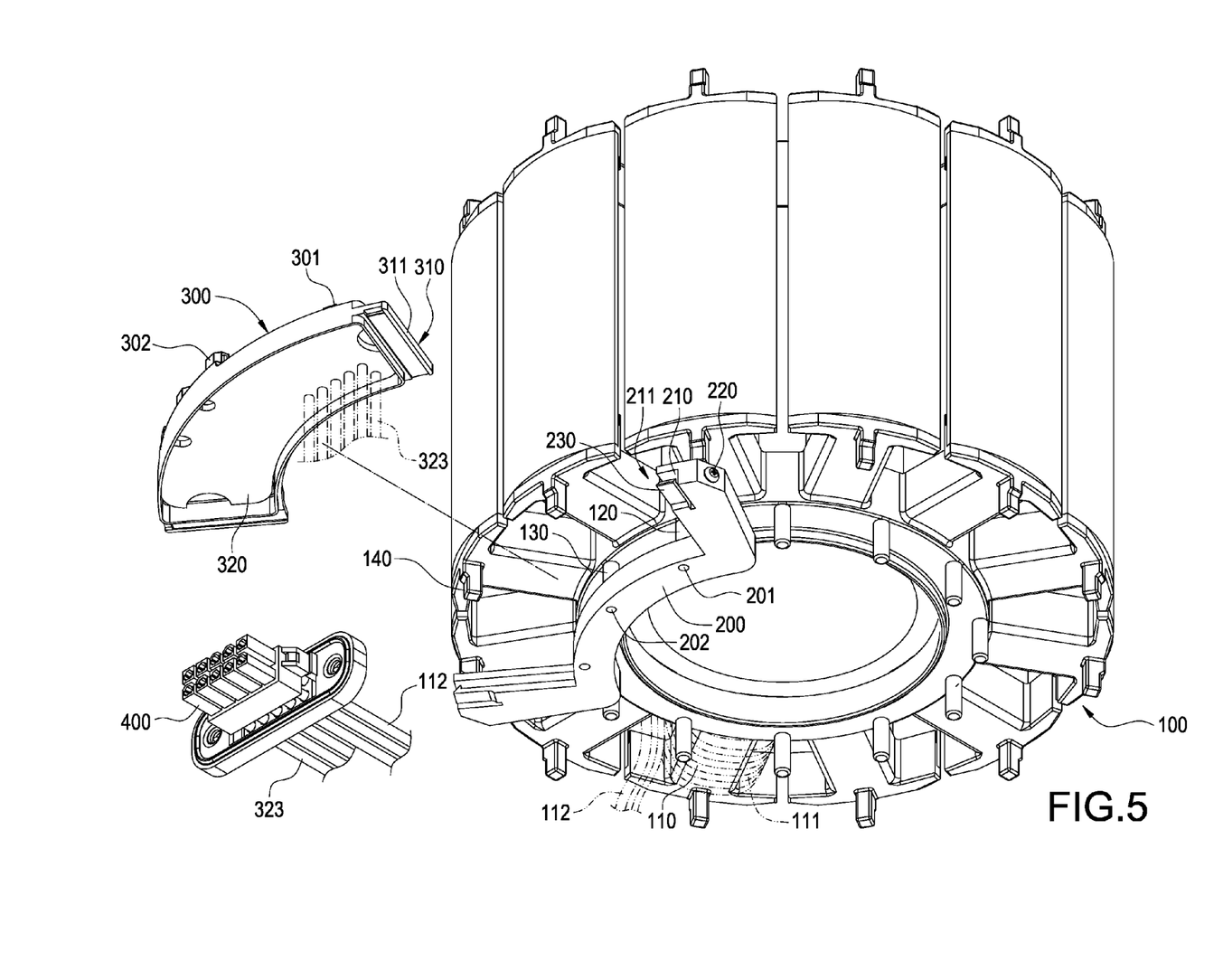
FIG. 5 is a perspective exploded view of a motor stator according to a third embodiment of the present invention.
Figure 6:
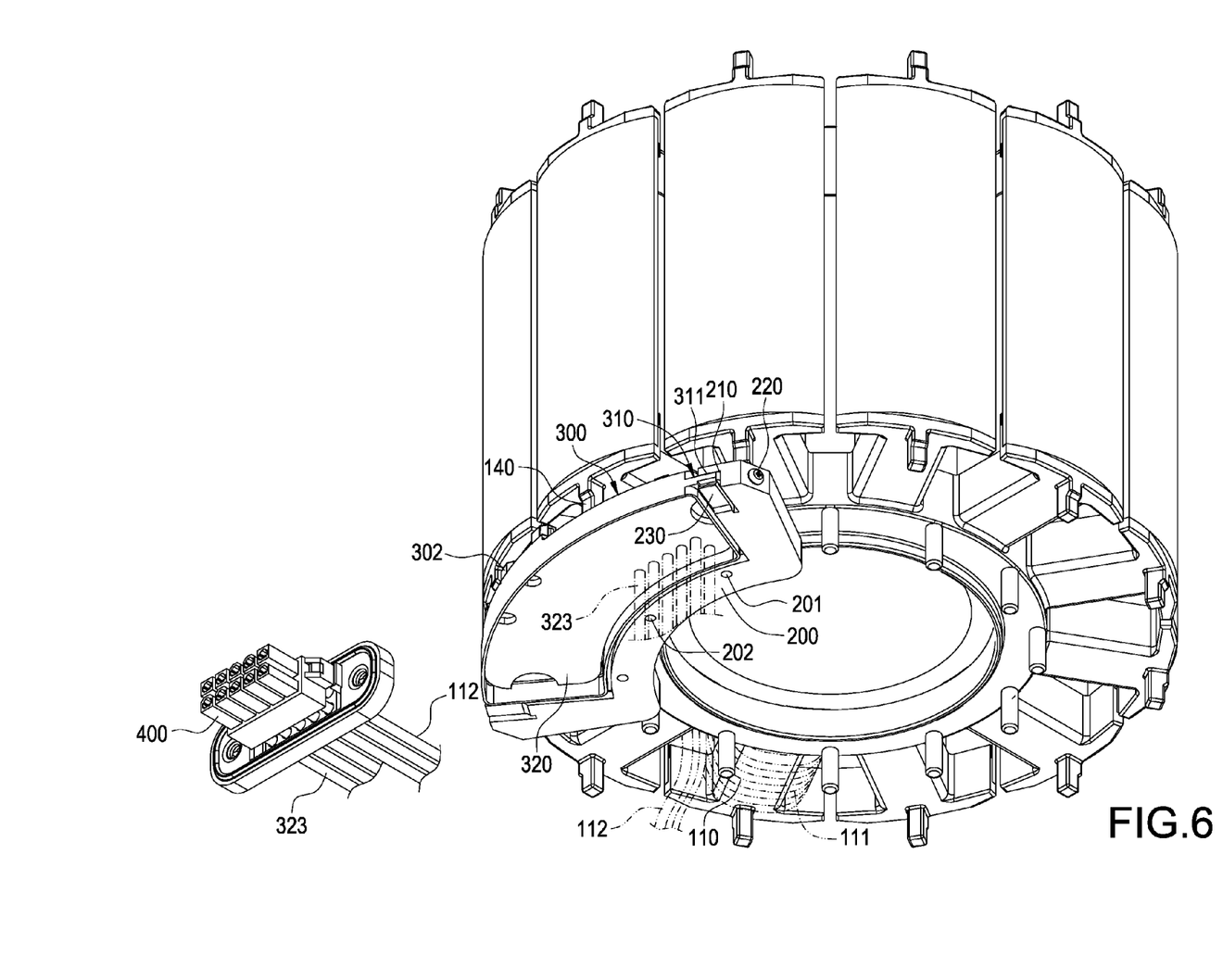
FIG. 6 is a schematic perspective view of the motor stator according to the third embodiment of the present invention.

Referring to FIGS. 5 and 6, a motor stator is provided according to a third embodiment of the present invention, which is adapted to be disposed on a stator base (not illustrated). The motor stator is externally enclosed by a motor rotor (not illustrated) pivotally disposed on the stator base. A magnetic field is produced upon powering on of the motor stator so as to drive the motor rotor to rotate. The motor stator of the present invention includes a bobbin bracket 100, a modular mounting bracket 200, and a modular change box 300. A structure of the motor stator is similar to that in the first embodiment, so descriptions about similar or the same parts are omitted therein for brevity.

The present embodiment is different from the first embodiment in that two flexible hooks 230 are disposed on the modular mounting bracket 200, and the two flexible hooks 230 are configured to engage the modular change box 300. It is preferable that each of the flexible hooks 230 is disposed corresponding to a respective one of the slide grooves 211, and toward the corresponding slide groove 211. Each flexible hook 230 is engaged with a respective one of the flanges 311. The modular mounting bracket 200 includes socket set screws which are fastened thereto and are each disposed corresponding to a respective one of the slide grooves 211. Each of the socket set screws 220 is inserted into a respective corresponding one of the slide grooves 211 to be fastened to the flange 311 slidably connected to the slide groove 211. By means of the flexible hook 230 and the socket set screw 220, the modular change box 300 is fixed to the modular mounting bracket 200.

Figure 7:
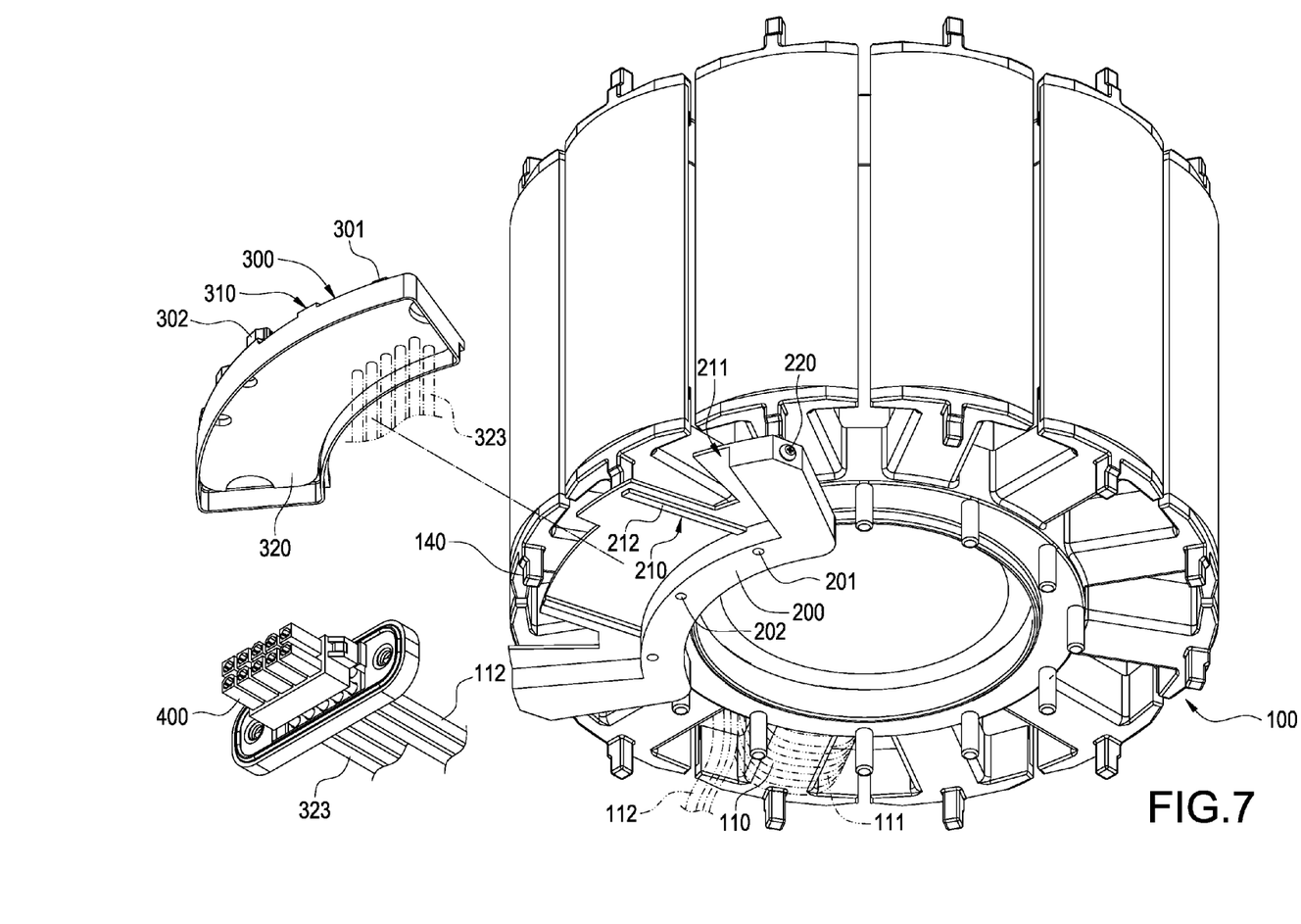
FIG. 7 is a perspective exploded view of a motor stator according to a fourth embodiment of the present invention.
Figure 8:
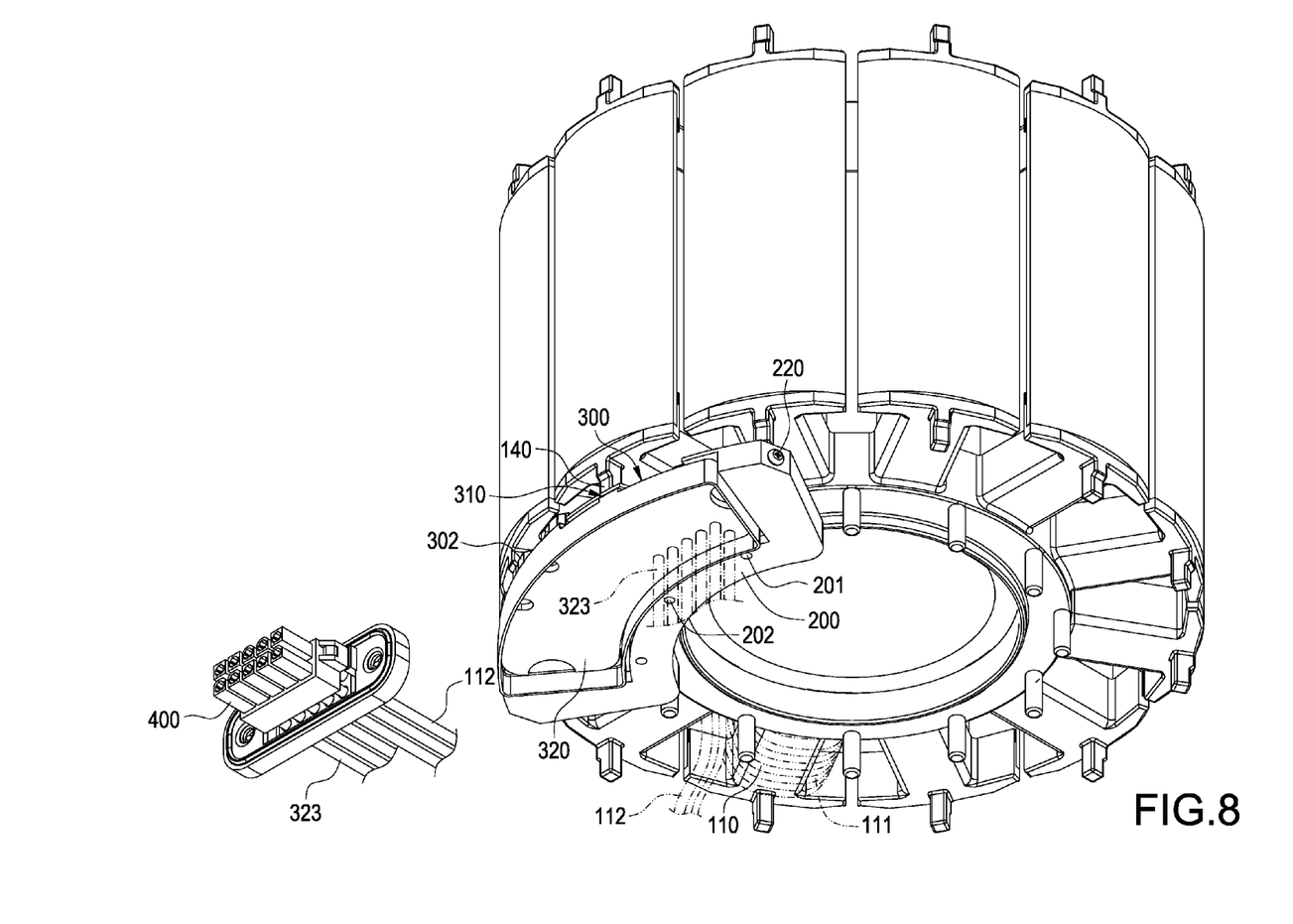
FIG. 8 is a schematic perspective view of the motor stator according to the fourth embodiment of the present invention.
Figure 9:
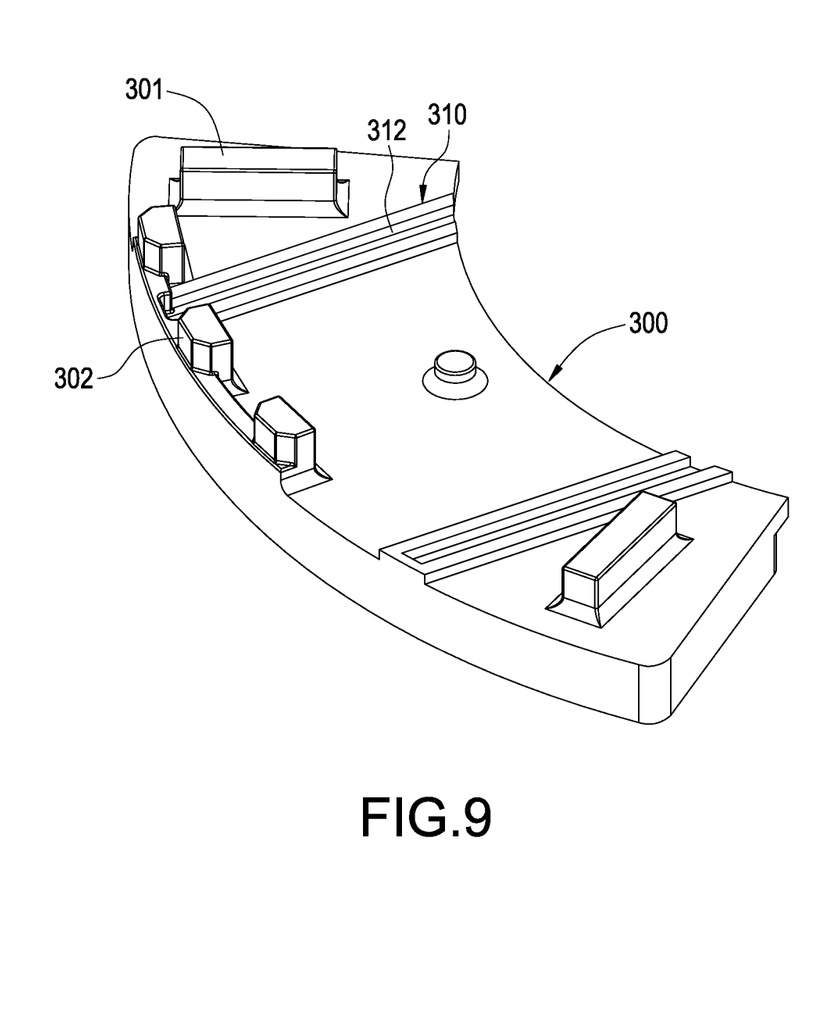
FIG. 9 is a schematic perspective view of a modular change box according to the fourth embodiment of the present invention.

Referring to FIGS. 7 to 9, a motor stator is provided according to a fourth embodiment of the preset invention, which is configured to be disposed on a stator base (not illustrated). The motor stator is externally enclosed by a motor rotor (not illustrated) pivotally disposed on the stator base. A magnetic field is produced upon powering on of the motor stator so as to drive the motor rotor to rotate. The motor stator of the present invention includes a bobbin bracket 100, a modular mounting bracket 200, and a modular change box 300.

According to the present embodiment, it is preferable that the bobbin bracket 100 is in a cylindrical shape, a plurality of bobbins 110 extend from a side surface of the bobbin bracket 100 along an axial direction of a motor rotation shaft, and the bobbins 110 are arranged circularly in a radial pattern around the motor rotation shaft. The bobbin bracket 100 is wound by at least one coil 111. In the present embodiment, structures described below are the same as the first embodiment (shown in FIG. 1), each coil 111 winds a respective one of the bobbins 110, and the coil 111 is connected to a connector 400 by means of a driving flat cable 112. At least one screw stud 120 and at least one positioning stud 130 extend from the bobbin bracket 100. In the present embodiment, a plurality of the screw studs and one positioning stud 130 are disposed on one end of the bobbin bracket 100. The positioning stud 130 and each of the screw studs 120 extend along the axial direction of the motor rotation shaft. A blocker 140 extends from a respective one of the bobbins 110, and each blocker 140 extends along the axial direction of the motor rotation shaft.

In the present embodiment, the modular mounting bracket 200 is a fan-shaped frame. The modular mounting frame 200 is disposed on one end of the bobbin bracket 100. The modular mounting bracket 200 is formed thereon with a screw hole 201 for screwing in an end of the screw stud 120 and is formed thereon with an insertion hole 202 for positioning and insertion of the positioning stud 130. The modular mounting bracket 200 can be positioned on the bobbin bracket 100 by insertion of the positioning stud 130 into the insertion hole 202, so that each screw stud 120 can be screwed in with ease. At least one blocker 140 on the bobbin bracket 100 is in contact with the modular mounting bracket 200, and the modular mounting bracket 200 and the bobbin 110 are spaced apart, thereby avoiding interfering with the coil 111 wound on the bobbin 110.

At least one first slide structure 210 is formed on the modular mounting bracket 200. In the present embodiment, there are two first slide structures 210, and each of the first slide structures 210 is a rib 212 perpendicular to an axial direction of the bobbin bracket 100, and the two ribs 212 are parallel to each other.

In the present embodiment, the modular change box 300 is a fan-shaped box. A plurality of chambers 301 and 302 are formed in the modular change box 300. A sensing circuit board 320 is disposed in the modular change box 300. The sensing circuit board 320 is electrically connected to the connector 400 by means of a sensing cable 323. At least one temperature sensing element 321 and a plurality of hall sensors 322 are disposed on the sensing circuit board 320. In the present embodiment, the temperature sensing element 321 and the hall sensors 322 are the same as the first embodiment (shown in FIG. 1), the sensing circuit board 320 preferably includes two temperature sensing elements 321 and three hall sensors 322, and the temperature sensing elements 321 and hall sensors 322 are disposed in two chambers 301 and 302, respectively. The hall sensors 322 are arranged along a circumferential direction of the bobbin bracket 100, and an arc region in which the hall sensors 322 are disposed preferably encompasses at least two bobbins 110. A rotation speed of the motor rotor can be calculated upon sensing a magnetic field variation among multiple places on the bobbin bracket 100 by using the hall sensor 322.

The modular change box 300 is formed with two second slide structures 310 corresponding to the first slide structures 210. In the present embodiment, each of the second slide structures 310 is a slide groove 312 which is slidably connected with a respective corresponding one of the ribs 212, and the two slide grooves 312 are disposed parallel to each other. Each rib 212 is slidably connected to a respective corresponding one of the slide grooves 312 so as to assemble the modular change box 300 to the modular mounting bracket 200 along a radial direction of the bobbin bracket 100. It is preferable that the rib 212 is in a dovetail form, and the slide groove 312 is in a dovetail groove form corresponding to the dovetail form, thereby preventing the modular change box 300 from falling off. At least one blocker 140 on the bobbin bracket 100 is in contact with the modular change box 300, so the modular change box 300 and the bobbin 110 are spaced apart, thereby avoiding interfering with the coil 111 wound on the bobbin 110.

The connector 400 is preferably connected to a control circuit board (not illustrated). The control circuit board supplies power to the coil 111 via the driving flat cable 112. The control circuit board is connected to the temperature sensing element 321 and the hall sensor 322 by means of the connector 400 via the sensing flat cable 323. The hall sensor 322 provides data about a frequency variation of the magnetic field. The temperature sensing element 321 is preferably a thermal fuse. When the motor has a temperature higher than the limit of the thermal fuse, the thermal fuse is broken to cause a broken circuit, and the motor stops. When there is a need to replace the sensing circuit board 320, the replacement can be completed simply by replacing the modular change box 300, and there is no need to remove the bobbin bracket 100.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:
1. A motor stator, comprising:
a bobbin bracket including a plurality of bobbins circularly disposed in a radial pattern;
a modular mounting bracket disposed on the bobbin bracket and being formed with a first slide structure, the first slide structure being perpendicular to an axial direction of the bobbin bracket; and
a modular change box having a sensing circuit board disposed therein and being formed with a second slide structure, the second slide structure being perpendicular to the axial direction of the bobbin bracket and slidably connected into the first slide structure so as to assemble the modular change box to the modular mounting bracket along a radial direction of the bobbin bracket,
wherein
the first slide structure is a rib perpendicular to the axial direction of the bobbin bracket and the second slide structure is a slide groove formed on the modular change box slidably connected with the rib, or
the first slide structure is a slide groove perpendicular to the axial direction of the bobbin bracket and the second slide structure is a flange slidably connected with the slide groove.
2. The motor stator of claim 1, further comprising a flexible hook disposed on the modular mounting bracket and snapped with the modular change box when the first slide structure is the slide groove perpendicular to the axial direction of the bobbin bracket.
3. The motor stator of claim 1, wherein the flexible hook is disposed toward the slide groove and engaged with the flange.
4. The motor stator of claim 1, further comprising a socket set screw fastened to the modular mounting bracket and inserted into the slide groove to be fastened to the flange.

5. The motor stator of claim 1, wherein the sensing circuit board is electrically connected to a connector by means of a sensing flat cable.

6. The motor stator of claim 1, wherein the bobbins are each wound by a coil, and the coil is electrically connected to a connector by means of a driving flat cable.

7. The motor stator of claim 1, wherein the bobbins are each wound by a coil, the coil is electrically connected to a connector by means of a driving flat cable, and the sensing circuit board is electrically connected to the connector by means of a sensing flat cable.

8. The motor stator of claim 1, further comprising a screw stud extending from the bobbin bracket.

9. The motor stator of claim 1, further comprising a positioning stud extending from the bobbin bracket.

10. The motor stator of claim 9, further comprising an insertion hole for positioning and insertion of the positioning stud is formed on the modular mounting bracket.

11. The motor stator of claim 1, further comprising a blocker extending from the bobbin and is in contact with the modular mounting bracket.

12. The motor stator of claim 1, further comprising a blocker extending from the bobbin and in contact with the modular change box.

13. The motor stator of claim 1, further comprising a plurality of hall sensors disposed on the sensing circuit board.

14. The motor stator of claim 13, further comprising a plurality of chambers corresponding to the hall sensors formed in the modular change box, and each of the hall sensors is disposed in one of the chambers, respectively.

15. The motor stator of claim 1, further comprising a temperature sensing element disposed on the sensing circuit board.

16. The motor stator of claim 15, further comprising a chamber formed in the modular change box, and the temperature sensing element is disposed in the chamber.

* * * * *